(12) United States Patent
Kurowska et al.

(10) Patent No.: US 11,796,058 B2
(45) Date of Patent: Oct. 24, 2023

(54) SEAL FOR FLUID LEVEL SENSING ASSEMBLY

(71) Applicant: Goodrich Corporation, Charlotte, NC (US)

(72) Inventors: Agata Kurowska, Kowale (PL); Dariusz Sapija, Dolnośląskie (PL); Piotr Kroczek, Dolnośląskie (PL)

(73) Assignee: GOODRICH CORPORATION, Charlotte, NC (US)

( * ) Notice: Subject to any disclaimer, the term of this patent is extended or adjusted under 35 U.S.C. 154(b) by 136 days.

(21) Appl. No.: 17/542,716

(22) Filed: Dec. 6, 2021

(65) Prior Publication Data

US 2022/0205536 A1 Jun. 30, 2022

(30) Foreign Application Priority Data

Dec. 28, 2020 (EP) .................................... 20461605

(51) Int. Cl.
*F16J 15/02* (2006.01)

(52) U.S. Cl.
CPC .................................. *F16J 15/025* (2013.01)

(58) Field of Classification Search
CPC .... F16J 15/025; F16J 15/3208; F16J 15/3212; F16J 15/3232; F16L 41/008; F16L 41/023; G01F 23/0007
See application file for complete search history.

(56) References Cited

U.S. PATENT DOCUMENTS

| | | | |
|---|---|---|---|
| 3,913,928 A | 10/1975 | Yamaguchi | |
| 4,934,668 A * | 6/1990 | Vassmer | F16F 9/362 |
| | | | 277/575 |
| 5,064,314 A | 11/1991 | Grooms et al. | |
| 5,593,166 A * | 1/1997 | Lovell | F16K 41/04 |
| | | | 277/516 |
| 5,615,895 A | 4/1997 | Guest | |
| 7,555,946 B2 * | 7/2009 | Sawert | G01F 23/36 |
| | | | 73/317 |
| 2004/0119244 A1 * | 6/2004 | Duke | F16J 15/3236 |
| | | | 277/549 |
| 2005/0067242 A1 * | 3/2005 | Vanmechelen | F16J 15/56 |
| | | | 188/322.17 |
| 2007/0214882 A1 * | 9/2007 | Sawert | G01F 23/363 |
| | | | 73/317 |

(Continued)

FOREIGN PATENT DOCUMENTS

GB 974751 A * 11/1964

OTHER PUBLICATIONS

Extended European Search Report for International Application No. 20461605.6 dated Jun. 29, 2021, 5 pages.

*Primary Examiner* — Nicholas L Foster
(74) *Attorney, Agent, or Firm* — CANTOR COLBURN LLP

(57) ABSTRACT

A seal for a fluid level sensor assembly mounted in a pipe includes a seal body arranged to be sealingly fitted around a sensor, the seal body having a first side defining a first lip and a second side defining a second lip, the second lip being thinner than the first lip, and a spring mounted to the seal and arranged to move the seal body along the sensor, when mounted around the sensor, such that the second lip provides a seal around the sensor and the first lip wipes the sensor to remove debris thereon.

10 Claims, 4 Drawing Sheets

(56) References Cited

U.S. PATENT DOCUMENTS

2010/0253007 A1* 10/2010 Tackett ................ F16J 15/182
                                                      277/513
2015/0369190 A1* 12/2015 Ropertz ............... F04B 53/143
                                                      417/437

* cited by examiner

SEAL FOR FLUID LEVEL SENSING ASSEMBLY

CROSS-REFERENCE TO RELATED APPLICATIONS

This application claims priority to European Patent Application No. 20461605.6 filed Dec. 28, 2020, the entire contents of which is incorporated herein by reference.

TECHNICAL FIELD

The present disclosure is concerned with providing a seal for a level sensor used for controlling operation of a valve to control fluid flow dependent on the level of fluid sensed by the sensor. The assembly is particularly for sealing an area in which a water (or other fluid) level sensor that is in communication with a valve, particularly a motorised valve, is mounted.

BACKGROUND

There are many applications, in various fields, where a fluid flow is regulated or controlled by opening and closing valves. In water supply or sanitation systems, for example, the flow of water through the system is managed by opening and closing valves to allow, block or direct the flow of water. Manually operated valves may be opened or closed by turning a handle or lever. Many systems use automatic or motorised valves that are opened or closed by means of an electric motor. In some systems, the opening or closing of the valves is dependent on the level of water in a part of the system. In some cases, a valve may be arranged to open in response to a water level exceeding a threshold level. In other cases, a valve may be normally open and configured to close in response to the water exceeding a threshold level. One example of the use of automatic valves responsive to water levels is in a so-called grey water system. Grey water is water in a system that has been used but that can be recycled for a different purpose e.g., drinking water or water from a wash basin can be recycled for use in a toilet flushing system. Grey water systems are often used in building complexes or in aircraft. Valves are provided to direct and control the flow of grey water to the flush. Grey water systems are just one example of a system in which a valve is controlled based on a sensed fluid level.

Designers of such fluid management systems face challenges in designing and mounting the level sensors to ensure accurate sensing and, thus, accurate control of the valves. Sensors located in the pipes through which the fluid flows can disrupt flow of the fluid. Further, sensors can become contaminated by particles and debris in the fluid. The positioning and location of the sensor is important and presents challenges.

There is therefore a need for an improved level sensor assembly which overcomes problems with existing assemblies.

SUMMARY

According to one aspect, there is provided a seal for a fluid level sensor assembly mounted in a pipe, the seal comprising a seal body arranged to be sealingly fitted around a sensor, the seal body having a first side defining a first lip and a second side defining a second lip, the second lip being thinner than the first lip, and a spring mounted to the seal and arranged to move the seal body along the sensor, when mounted around the sensor, such that the second lip provides a seal around the sensor and the first lip wipes the sensor to remove debris thereon.

The seal may also include a gasket between the first and second lip to support the spring.

The spring preferably moves the seal body in response to a fluid pressure acting on the first lip.

The seal may also include a motor to cause movement of the seal along the sensor.

Also provided is a level sensor assembly comprising a level sensor mounted in a sensor area of a pipe and a seal as described above, mounted around the sensor, in the sensor area.

The assembly may also comprise a hard stop to limit movement of the seal body along the sensor. The hard stop preferably comprises a plurality of discrete elements around the sensor area.

The pipe may comprise a wye fitting having a main branch defining a fluid path for a fluid to flow from an inlet end to an outlet end arranged to be connected to an inlet of a valve, and a second branch opening from the main branch at a position intermediate the inlet end and the outlet end and in which the sensor is located to detect a level of fluid in the second branch and to generate a command signal for operation of the valve according to the level detected.

Also provided is a fluid management system comprising a valve and an assembly as described above. The system may also comprise a fluid pipe arranged for connection with the valve via the assembly.

BRIEF DESCRIPTION OF THE DRAWINGS

Preferred embodiments will now be described, by way of example only, with reference to the accompanying drawings.

DETAILED DESCRIPTION

Figure 1:
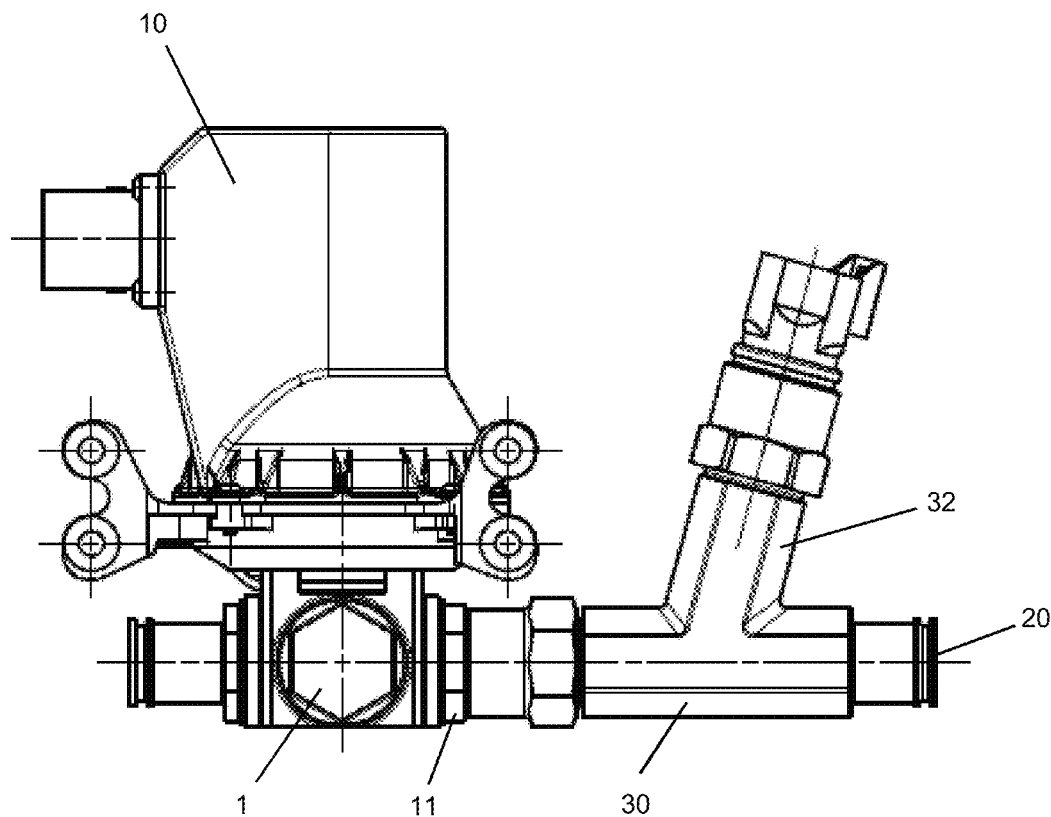
FIG. 1 is a schematic view of an assembly to which a level sensor can be mounted with a seal according to the disclosure.

Referring first to FIG. 1, the seal of the disclosure will be described, by way of example only, for a system comprising a valve 1 e.g. a ball valve, connected between a first part of a water system e.g. a reservoir and another part of the water system e.g. waste pipe 20. Depending on the type of water system, the valve 1 may be a normally open valve or a normally closed valve. Opening and closing of the valve 1 is controlled based on a water level in the system detected by a water level sensor 2. For a normally open valve, the valve motor 10 is commanded to close the valve if the sensor detects a water level above a given threshold. For a normally closed valve, the valve motor is commanded to open the valve if the sensor detect a water level above a give threshold. For the following description, a normally closed valve will be used, by way of example only. The same principles will, however, apply to a normally open valve.

As seen in the drawings, the level sensor 2 is mounted in a wye fitting 30 attached between the valve inlet 11 and the waste pipe 20. One branch 31 of the wye fitting 30 is in line with the waste pipe 20. The other branch 32 of the wye fitting extends from the first branch at an angle e.g., 45 degrees. The level sensor 2 is mounted in the second branch out of, but close to the flow of water through the waste pipe.

A connector 40 joins the wye fitting 30 to the valve inlet 11.

Figure 2:
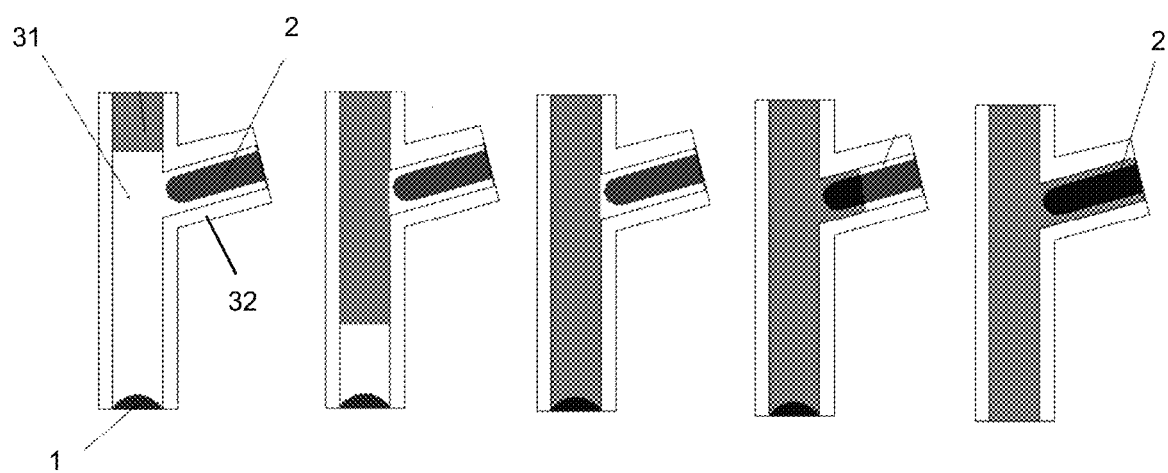
FIG. 2 shows the water flow in an assembly in which the level sensor is mounted in a wye fitting.

In the example shown, while the waste pipe is empty, the valve 1 is closed. As water starts to fill the waste pipe (FIG. 2(*a*)) it approaches the branch of the wye fitting in which the sensor 2 is located. Water continues (FIG. 2(*b*)) to flow along the pipe 20 and is blocked (FIG. 2(*c*)) by the closed valve 1. As more water flow into the waste pipe 20, it starts to fill the wye branch 32 where the sensor 2 is located (FIG. 2(*d*)). When the sensor is covered (FIG. 2(*e*)) it sends a command signal to the motor (not shown) to cause the valve 1 to open. In a grey water system as mentioned above, for example, this then allows the accumulated water to be released into the flush system.

As mentioned above, it is important for reliable operation of the sensor and the valve that the sensor is fixed in the correct location and orientation. Whilst the sensor can be fixedly secured in the wye fitting, it is also important to ensure that the connection between the wye fitting and the valve inlet is such as to secure the position and orientation of the wye fitting itself.

Figure 7:
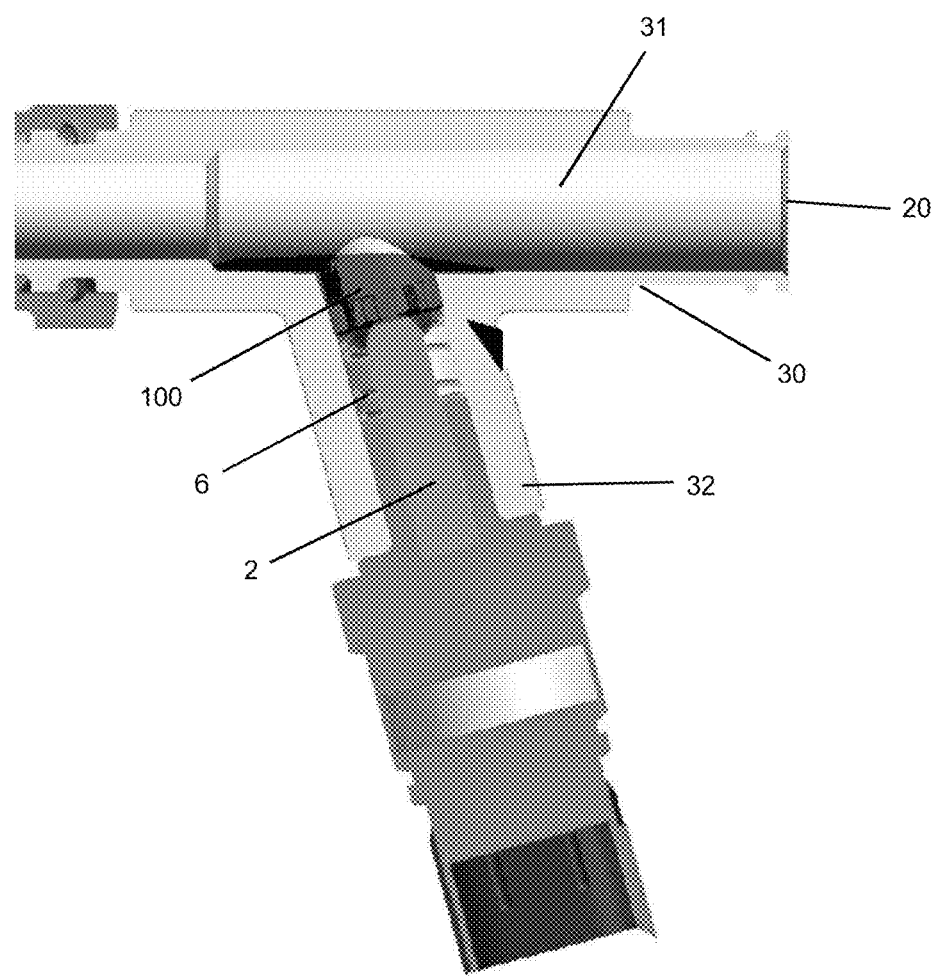
FIG. 7 is a section view of an assembly in which the sensor is mounted according to the disclosure, in a different orientation.

It is important to ensure that the sensors are mounted such that the area where the level sensor 2 is located is oriented to avoid water/fluid settling in that area over the sensor. If this happens, the sensor can become contaminated with dirt or mud or other pollutants in the water. This can make the sensor less accurate or even damage the sensor, thus adversely affecting the water flow function and also risks the growth of fungus/development of bacteria in the system. This generally means that the fitting or pipe in which the sensor is located must have a predefined and set orientation relative to the flow path of the water or fluid. If for example, the sensor were mounted in a wye fitting that was oriented in an 'upside down' orientation relative to the flow path, and relative to that shown in FIG. 2, as can be seen in the orientation of FIG. 7, the water flowing into the sensor area (see stage (d) and (e) of FIG. 2) would remain in that area even after opening of the valve and would flood and contaminate the sensor.

Conventionally, in such systems, fittings and pipes are connected by a so-called clamshell connector which is a one-piece connector consisting of two halves joined by a hinge area which allows the structure to come together to close. Such connectors are quick and easy to use and provide secure attachment of components. A clam shell connector, however, does not secure the relative orientation of two connected pipe components and without additional fixing components or adhesives, the connected pipes will be able to rotate relative to each other. This means that to ensure the necessary orientation to protect the sensor, such additional fasteners or other complex fastening structures are required.

Further, there may be environments in which the fittings, including where the sensor is mounted, could be arranged in a more optimal orientation in terms of space saving or access. This optimal orientation, however, cannot be selected due to the risk of the creation of a water trap in the sensor area that could contaminate the sensor.

The present disclosure provides a seal for the area where the level sensor is mounted which enables the sensor to be mounted in different orientations without the risk of causing a water trap in the sensor area. The seal arrangement also provides cleaning of the sensor as will be described below.

Although described for an assembly in which the sensor is mounted in a wye fitting, the seal could also have benefits in arrangements where the sensor is mounted in a simple pipe fitted to the valve inlet.

Figure 3:
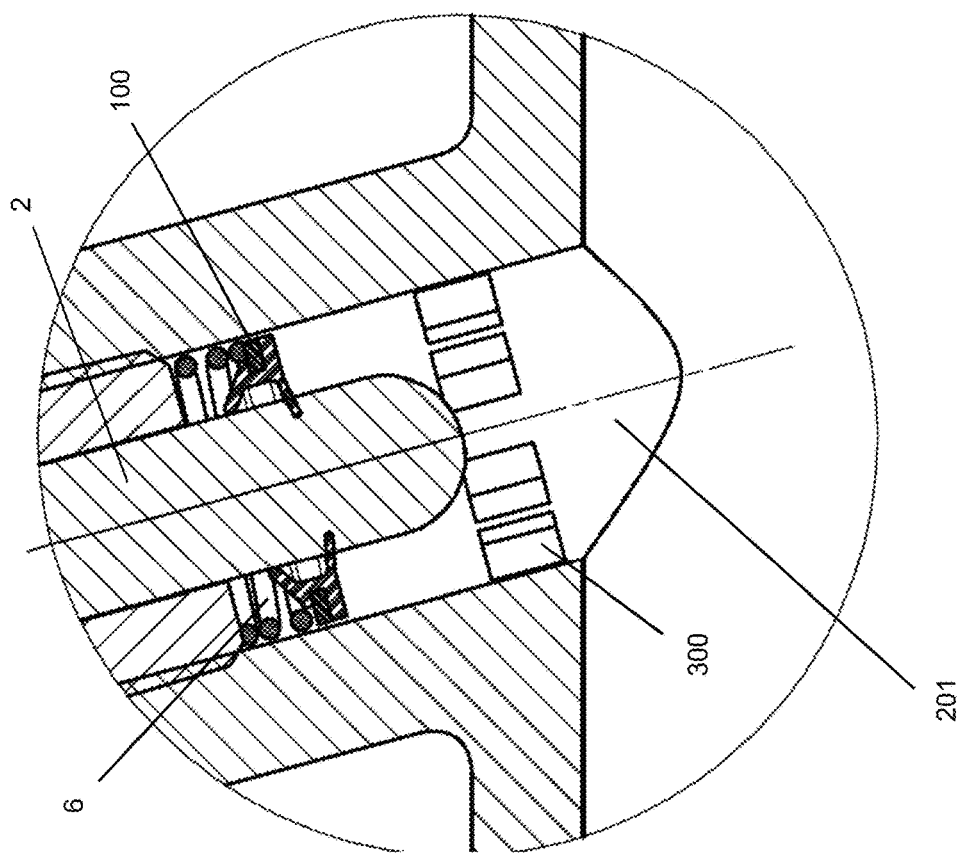
FIG. 3 is a cross-section of an assembly incorporating a seal in accordance with this disclosure.
Figure 3:
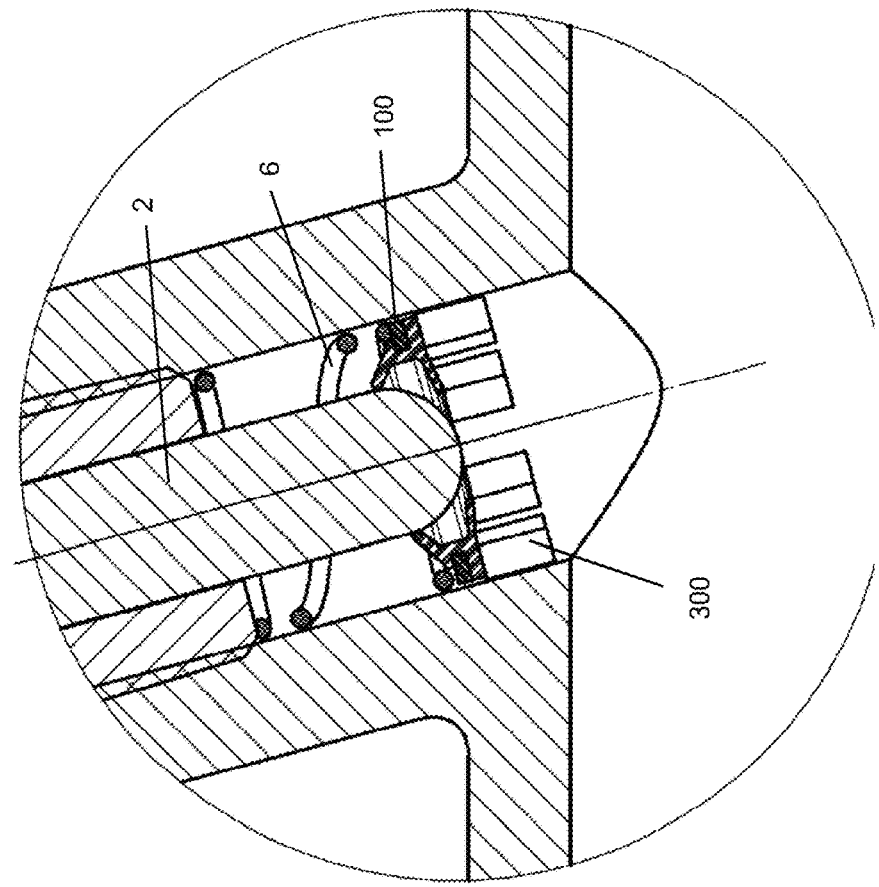

With reference now to FIG. 3, the present disclosure provides a seal 100 mounted in an area of piping in which the sensor 2 is mounted and mounted around the sensor 2. Without this seal, as in conventional arrangement, there is a risk of air bubbles forming in the sensor area and adversely affecting the accuracy of the sensor. There is the risk of the sensor being contaminated as it is covered with dirty water.

The seal 100 is mounted on a spring 6 also located around the sensor 2.

Figure 5:
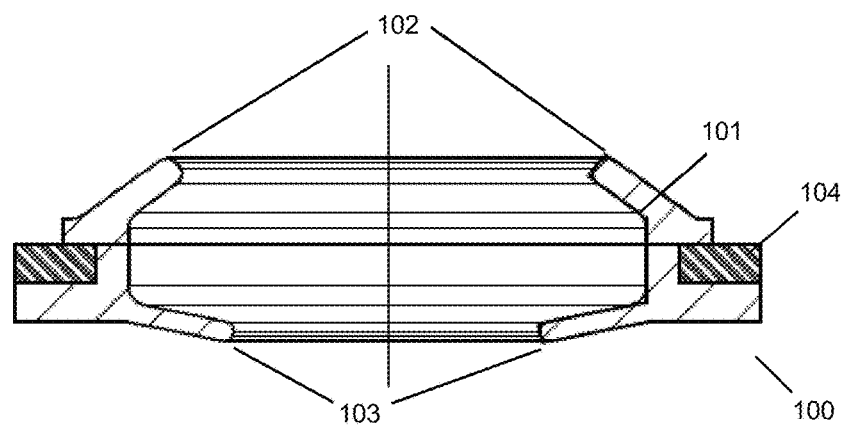
FIG. 5 is a perspective view of a seal according to one example.
Figure 5:
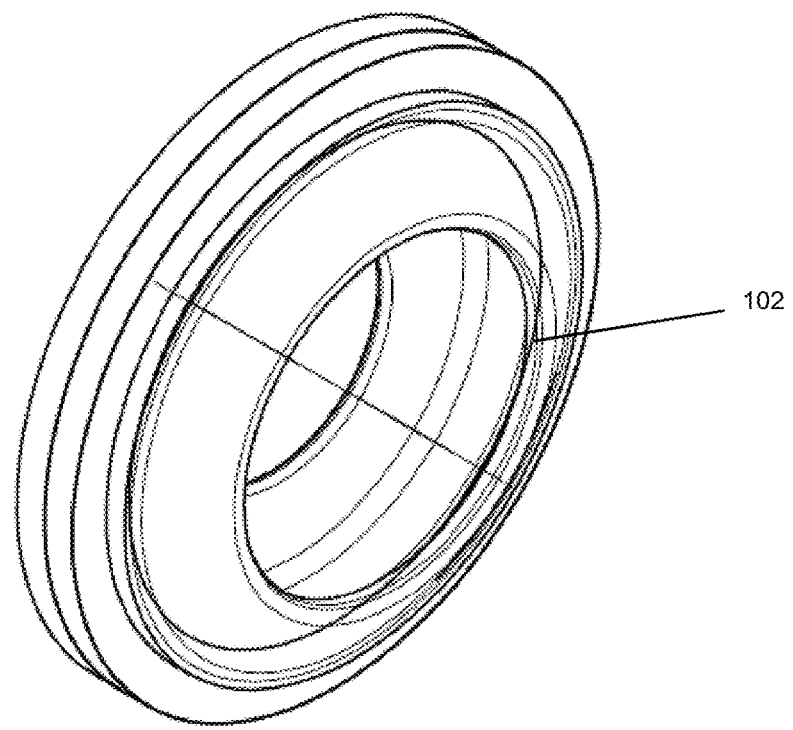
Figure 6:
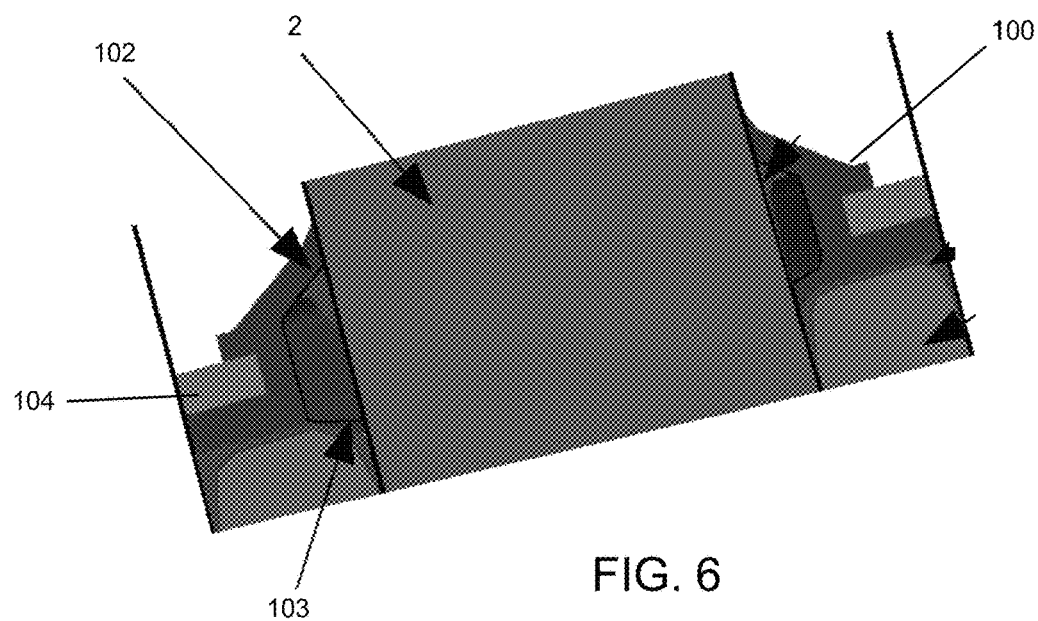
FIG. 6 is a section view of a seal in use.

The seal 100, as best shown in FIG. 5, is a two-way lip seal in that it comprises an annular body 101 having a first side on which a first lip 102 is formed and a second side on which a second lip 103 is formed. The second lip 103 is thinner than the first lip 102. The body of the seal may be shaped to receive a support e.g. a gasket 104 made of e.g. plastic or metal to provide improved support for the spring 6.

Figure 4:
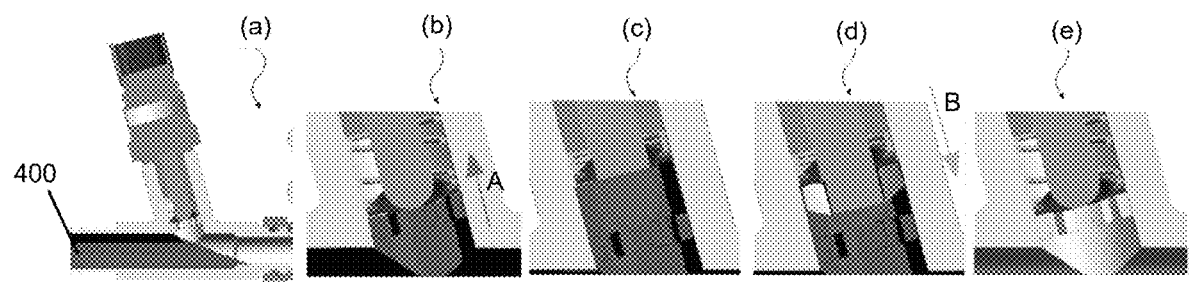
FIG. 4 shows the water flow in an assembly such as that shown in FIG. 3.

The seal 100 is mounted, as best seen in FIG. 3 or FIG. 4, around the sensor 2 and is secured to one end of the spring 6, the other end of which is secured to the sensor.

In a preferred embodiment, the movement of the seal 100 relative to the sensor 2 is limited by hard stops 300.

The operation of the seal will now be described with particular reference to FIG. 4. Initially, when the area where the sensor 2 is mounted, contains no water, the spring 6 is relaxed, thus biasing the seal towards the inlet 201 of the sensor area, from the flow path 20 (FIG. 4(*a*)). As water 400 flows along the flow path of pipe 20, the valve (not shown) at the end of the flow path being closed, the water then flows into the sensor area (FIG. 4(*b*)). The seal first lip 102 prevents the water flowing past the seal 100 and the pressure of the water on the first lip 102 pushes against the force of the spring 6 moving the seal 100 along the sensor 2 in the direction of arrow A, causing the end of the sensor closest to the inlet to be exposed to water (FIG. 4(*c*)) and to thus send a control signal to open the valve. At this stage, dirt from the water can cover part of the lip seal that is exposed to the water and also the sensor that is exposed to the water. As the valve opens allowing water to flow out of the flow path, the pressure on the seal from the water in the flow path is reduced and the spring 6 is able to expand again pushing the seal back in the direction of arrow B along the sensor towards the inlet 201 (FIG. 4(*d*)). The seal, being closely fitted around the sensor, scrapes any dirt or debris that has been deposited on the seal from the water to which it was exposed. Further movement of the seal is prevented by the hard stop 300 (FIG. 4(*e*)). During this cycle, the function of the thinner lip 103, which is located inwardly of the thicker lip 102 with respect to the sensor area, fits tightly around the sensor to provide sealing to protect the spring from the ingress of water. The function of the thicker lip 102 is to force dirt and debris, which may have been present in the water and deposited on the sensor 2 as the sensor area filled with water, out of the sensor area when the water moves out of the area as the valve opens and the spring relaxes. When there is no water in the seal area (e.g. as shown in FIG. 3), the thin lip 102 is spaced from the sensor (in the direction of the inlet 201) s as to allow any water that has accumulated in the seal to drain.

The hard stop can be in the form of a ring or, as shown, as a number of discrete elements formed around the circumference of the inlet 201. Several parts with gaps therebetween, as shown, improve the ability of the seal 100 to clean out dirt and debris from the sensor area.

In a modified version, the movement of the lip seal may be controlled using e.g. a small motor or solenoid so that it can wipe the sensor independent of the water flow or pressure.

The use of the lip seal makes it possible to mount the sensor 2 in any position or orientation (e.g. in the upside down position of FIG. 7) without the risk of a large amount of water being trapped in the sensor area. This avoids or reduces the risk of a false reading from the sensor and, thus, faulty operation of the valve. The fact that no water remains in the sensor area also reduces the risk of damage due to freezing.

The aspects of the assembly of this disclosure described above provide a number of further advantages over existing arrangements. For example, the parts can be additively manufactured thus reducing costs and allowing for ease of assembly. The features of the disclosure can be used with many types of valve and in many types of flow system and with different fluids.

The invention claimed is:

1. A seal for a fluid level sensor assembly mounted in a pipe, the seal comprising:
a seal body arranged to be sealingly fitted around a sensor, the seal body having:
a first side defining a first lip; and
a second side defining a second lip, the second lip being thinner than the first lip; and
a spring mounted to the seal and arranged to move the seal body along the sensor, when mounted around the sensor, such that the second lip provides a seal around the sensor and the first lip wipes the sensor to remove debris thereon.

2. The seal of claim 1, further comprising a gasket between the first and second lip to support the spring.

3. The seal of claim 1, wherein the spring moves the seal body in response to a fluid pressure acting on the first lip.

4. The seal of claim 1, further comprising a motor to cause movement of the seal along the sensor.

5. A level sensor assembly comprising:
a level sensor mounted in a sensor area of a pipe; and
a seal, as claimed in claim 1 mounted around the sensor, in the sensor area.

6. The assembly of claim 5, further comprising a hard stop to limit movement of the seal body along the sensor.

7. The assembly of claim 6, Wherein the hard stop comprises a plurality of discrete elements around the sensor area.

8. The assembly of claim 5, wherein the pipe comprising a wye fitting having a main branch defining a fluid path for a fluid to flow from an inlet end to an outlet end arranged to be connected to an inlet of a valve, and a second branch opening from the main branch at a position intermediate the inlet end and the outlet end and in which the sensor is located to detect a level of fluid in the second branch and to generate a command signal for operation of the valve according to the level detected.

9. A fluid management system comprising:
a valve; and
an assembly that includes a level sensor assembly comprising:
a level sensor mounted in a sensor area of a pipe; and
a seal, as claimed in claim 1 mounted around the sensor, in the sensor area.

10. The system of claim 9, further comprising a fluid pipe arranged for connection with the valve via the assembly.

\* \* \* \* \*